(No Model.) 3 Sheets—Sheet 1.

V. BONZAGNI.
APPARATUS FOR CLEANSING BEER PIPES, &c.

No. 598,301. Patented Feb. 1, 1898.

Witnesses,
E. F. Stearns
J. Pratt

Inventor,
Vincenzo Bonzagni,
pr Norman W. Stearns,
Atty.

THE NORRIS PETERS CO., PHOTO-LITHO., WASHINGTON, D. C.

(No Model.) 3 Sheets—Sheet 2.
V. BONZAGNI.
APPARATUS FOR CLEANSING BEER PIPES, &c.
No. 598,301. Patented Feb. 1, 1898.
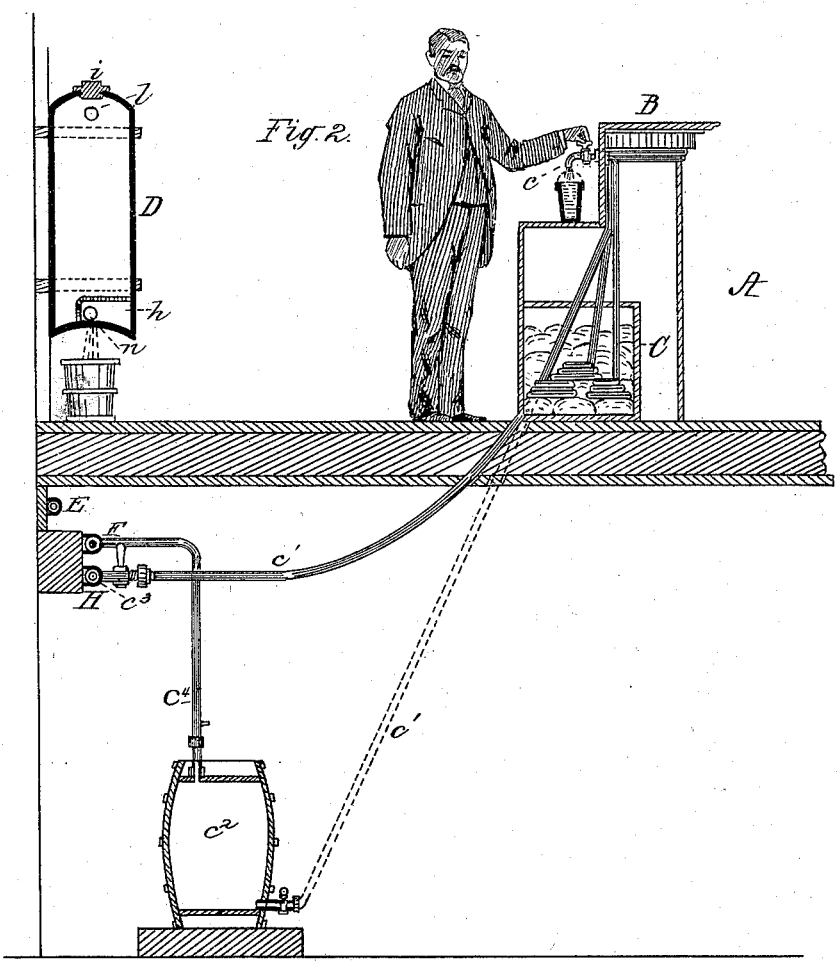
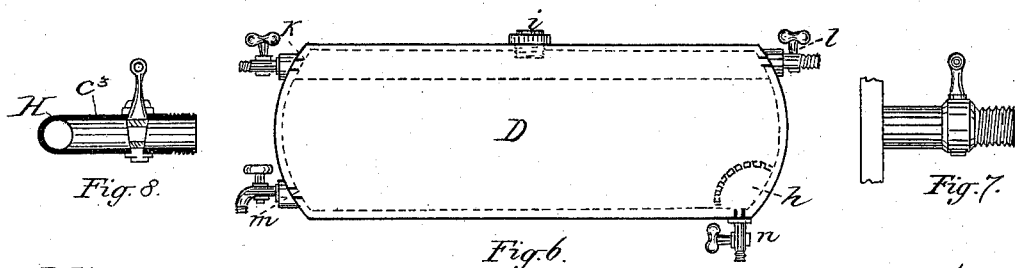

(No Model.) 3 Sheets—Sheet 3.
V. BONZAGNI.
APPARATUS FOR CLEANSING BEER PIPES, &c.
No. 598,301. Patented Feb. 1, 1898.
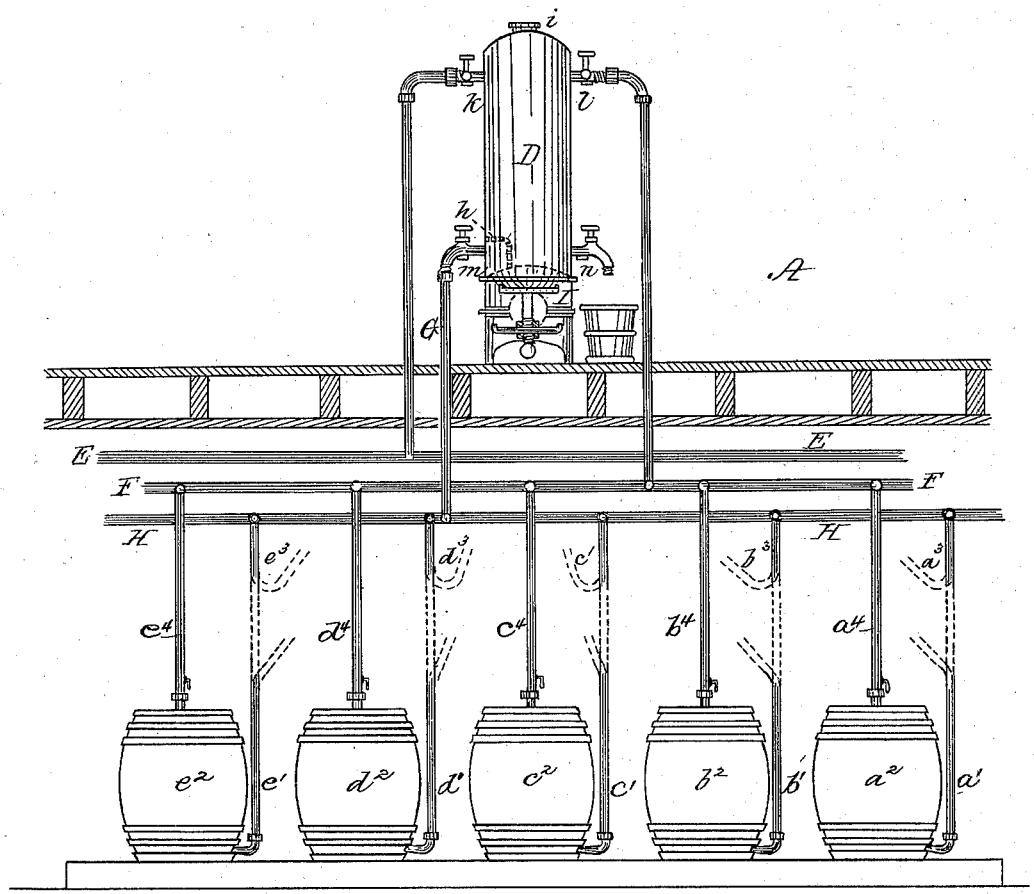
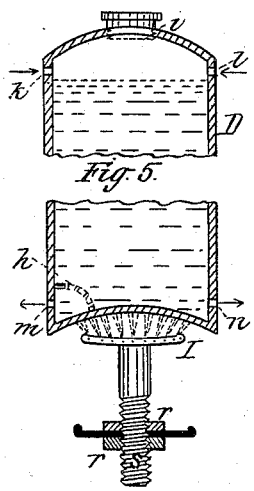
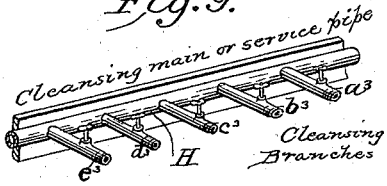
Witnesses,
C. F. Stearns
J. Pratt
Inventor,
Vincenzo Bonzagni,
pr Norman W. Stearns,
Atty.

UNITED STATES PATENT OFFICE.

VINCENZO BONZAGNI, OF BOSTON, MASSACHUSETTS.

APPARATUS FOR CLEANSING BEER-PIPES, &c.

SPECIFICATION forming part of Letters Patent No. 598,301, dated February 1, 1898.

Application filed October 30, 1897. Serial No. 656,926. (No model.)

*To all whom it may concern:*

Figure 1:
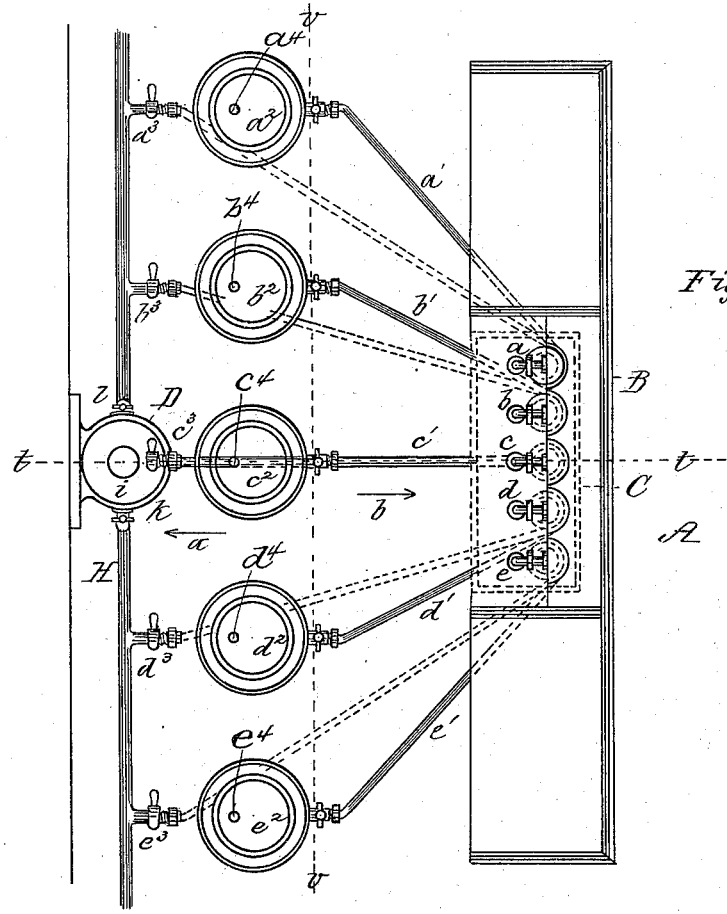
Figure 4:
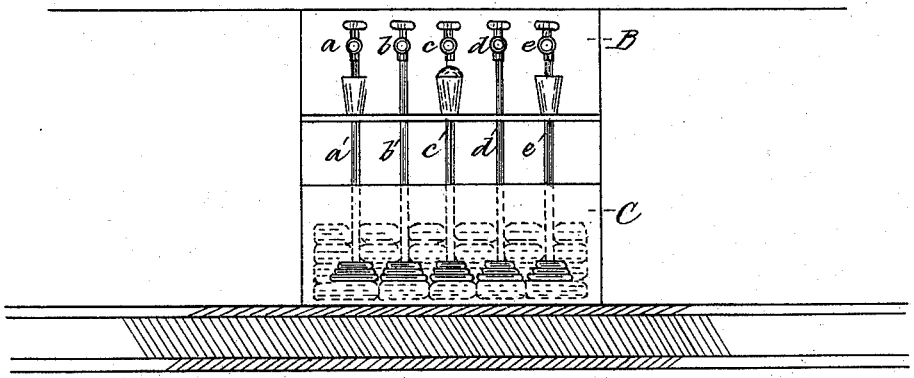

Be it known that I, VINCENZO BONZAGNI, of Boston, Suffolk county, Massachusetts, have invented an Apparatus for Cleansing Pipes through which Beer, Wine, Soda, and other Beverages are Drawn, of which the following is a full, clear, and exact description, reference being had to the accompanying drawings, making part of this specification, in which—
Figure 1 represents in plan an apartment in which is located a counter over which various beverages are supplied, a portion of the floor being removed to bring to view a number of barrels containing the beverages with my apparatus for cleansing their pipes applied thereto. Fig. 2 is a vertical section on the line $t\,t$ of Fig. 1. Fig. 3 is approximately a vertical section on the line $v\,v$ of Fig. 1, looking in the direction of the arrow $a$; Fig. 4, a similar section on said line $v\,v$, looking in the direction of the arrow $b$. Fig. 5 is an enlarged vertical section through the tank of my apparatus in which the cleansing liquid may be heated. Fig. 6 shows my tank in a horizontal position and with a different arrangement of inlet and outlet openings; Figs. 7 and 8, details of a branch of the main cleansing-pipe. Fig. 9 is a perspective view of the main cleansing-pipe with its branches.
It is well known in serving beer, wine, soda, and other beverages conducted through pipes leading from barrels or other receptacles to draft or supply cocks that sooner or later the interior of the service-pipes becomes coated with the sediment in said liquor, and where the flow is temporarily suspended—as, for instance, during the night, when not required for use—the pipes become foul and the impurities therein taint the liquor and frequently cause sickness. My present invention has for its object to provide means for quickly and thoroughly cleansing at a single operation the interior of any number of said pipes, either straight or coiled, or both;
and this invention consists in a tank having an inlet for receiving a supply of water, an opening (controlled by a cover) by which a cleansing agent (soluble in water) is introduced, an inlet for the admission of air under pressure, an outlet from which the cleansing liquid is forced into branch pipes corresponding in number to and with which the beverage-supply pipes are connected when the latter are uncoupled from their sources of supply, and, if desired, an outlet for drawing the cleansing liquid for various domestic purposes, the cleansing liquid being preferably, but not necessarily, heated by any suitable means, the construction and operation of my said apparatus being hereinafter particularly described and claimed.

In the said drawings, A represents an apartment in which is located a counter B, over which beer, soda, and other beverages are supplied from draft-cocks $a\,b\,c\,d\,e$, connected with pipes $a'\,b'\,c'\,d'\,e'$, leading to the bottoms of barrels or receptacles $a^2\,b^2\,c^2\,d^2\,e^2$, a portion of each pipe being disposed in a coil located in an ice-box C near its draft-outlet and preferably under the counter, the floor of the apartment being represented as broken away to expose to view the position of the receptacles in the cellar. The outlet of each receptacle is controlled by a faucet for opening and closing the same in the usual way, said faucet having an outer screw-thread over which turns a coupling (with which each pipe is provided at its barrel end) of well-known construction, by which means the flow of the different beverages from their source of supply may be discontinued preparatory to connecting said pipes with my improved apparatus for cleansing all of their interiors at one operation, the construction of which apparatus will now be described.

D is a tank secured by brackets or other means of support to the wall of the compartment at some convenient place—for instance, behind the counter. At the bottom of the inside of this tank is a perforated partition or strainer $h$ and an opening $i$, provided with a cover at its top, through which opening is introduced any suitable cleansing agent soluble in water—for instance, sal-soda, chlorid of lime, potash, &c. At one side of the top of the tank—for instance, at its left side, Fig. 3—is an inlet $k$, through which water is supplied either by a pipe E, connected with the street-service main, if such pipe leads into the house, or, if not, by water introduced through the opening $i$, the pipe leading to the inlet $k$ being controlled by a stop-cock. On the other side at the top of the tank is another inlet $l$, connected with a main pipe F, which is for the admission of air under pressure either from an air pump or blower of well-known construction, (not shown,) said inlet being provided with a stop-cock. At one side of the bottom of the tank is an outlet $m$, controlled by a faucet. With this outlet $m$ is coupled one end of a cleansing-pipe G, leading to a horizontal main pipe H, having a series of branches $a^3\ b^3\ c^3\ d^3\ e^3$, corresponding in number to the beverage-supply pipes $a'\ b'\ c'\ d'\ e'$, leading to the several beverage-receptacles, each of the branches $a^3\ b^3$, &c., being provided with a faucet and with an outer screw-threaded end over which the screw-threaded coupling on the corresponding beverage-supply pipe is adapted to turn. Also at the bottom of the tank on the side opposite the outlet $m$ may be located, if desired, another outlet $n$, from which the cleansing liquid may be drawn for use in washing glasses, utensils of various kinds, and for general washing requirements, said outlet being controlled by a stop-cock. (See Fig. 3.)

The capacity of the tank must be adequate to contain sufficient cleansing liquid for thoroughly cleansing all of the beverage-pipes $a'\ b'\ c'\ d'\ e'$ at one and the same time without refilling the tank and not merely a sufficient quantity for cleansing each pipe separately.

The shape of the tank will be governed by the form and position of the space in which it is to be located, and it will be desirable to locate it within convenient reach of the person using the apparatus.

The water in the tank is preferably heated by any medium which happens to be most convenient—for instance, by gas-jets from a burner I, located under the tank, Figs. 2, 3, and 5, or by an oil-lamp, or by electricity through a resistance-coil within the tank, the efficiency of the cleansing liquid in a hot or warm state being thereby increased, care being taken to remove the cover of the opening $i$ in the top of the tank and close the air-inlet $l$ about the time the heat is applied. The position of the flame from the burner I, Fig. 5, is conveniently regulated by a pair of screw-nuts $r$, turned on the screw-threaded exterior $s$ of said burner to raise or lower the same and adjust the flame to or from the under side of the tank.

Operation: To cleanse the beverage-conducting pipes $a'\ b'\ c'\ d'\ e'$, it is necessary to turn the lower stop-cocks of all the barrels $a^2\ b^2\ c^2\ d^2\ e^2$ to shut off the flow of their liquid contents therefrom. Then uncouple the contiguous or lower ends of the several pipes $a'\ b'\ c'\ d'\ e'$ and connect said ends with the screw-threaded ends of their respective contiguous branch pipes $a^3\ b^3\ c^3\ d^3\ e^3$ of the cleansing main pipe. Then open all of the cocks of said branch pipes, after which open the cock of the outlet $m$ and replace the cover to the inlet $i$, through which the cleansing ingredient is introduced, and close the flow of fresh water into the tank by shutting the inlet $k$. Then open the cock of the air-inlet $l$, when the pressure of the air will force the cleansing liquid through the several branches $a^3\ b^3\ c^3\ d^3\ e^3$ into and through the several beverage-conducting pipes $a'\ b'\ c'\ d'\ e'$ and out of the several draft-cocks. After sufficient of the cleansing liquid has been forced through all of the pipes to scour their interiors and the cleansing liquid is exhausted from the tank, the supply of fresh water—i. e., not containing any cleansing ingredient—is again admitted into the inlet $k$ and forced into and through the beverage-pipes and out of their draft-cocks, by which their interiors are thoroughly washed and rinsed.

From the foregoing description it will be understood that the insides of all the beverage-pipes and their draft-cocks are instantly and at a single operation (by one tankful) of the cleansing liquid freed from the injurious sediment which has accumulated therein, and, furthermore, that the disagreeable alkaline taste inherent in the cleansing agent is entirely removed thereafter by admitting and forcing a fresh supply of water through them in an efficient, simple, and expeditious manner.

I claim—

1. An apparatus for cleansing beer-pipes, &c., consisting of the following instrumentalities viz., a permanently-located tank D having a cover-controlled opening $i$ through which a cleansing material is introduced, an inlet $k$ for receiving a water-supply, an inlet $l$ for the admission of air under pressure, an outlet $m$, and a main or service pipe H connected therewith and into which the cleansing agent is forced, said pipe H extending in proximity to the positions occupied by the several beverage-receptacles $a^2\ b^2\ c^2\ d^2\ e^2$ and a series of minor or branch pipes $a^3\ b^3\ c^3\ d^3\ e^3$ projecting at intervals, from the main cleansing-pipe, at points along its length and contiguous to the said receptacles in combination with, corresponding in number to, and with which their respective beverage-draft pipes $a'\ b'\ c'\ d'\ e'$ are adapted for immediate connection, when the latter are temporarily uncoupled from their beverage-receptacles, whether the latter be empty, full or partially full, a generator for supplying the compressed air, branch pipes for conducting the same into the beverage-receptacles for forcing the contents therefrom through the draft-pipes $a'\ b'\ c'\ d'\ e'$, said latter pipes being provided with stop-cocks for permitting and arresting the flow of their respective contents, all constructed and arranged to operate substantially as described.

2. A permanently-located tank D, its cover-controlled opening $i$, its water-inlet $k$, its compressed-air inlet $l$, its cleansing-agent outlet $m$, a main, cleansing agent service-pipe H and its series of minor or branch pipes $a^3\ b^3\ c^3\ d^3\ e^3$ projecting at intervals therefrom at points contiguous to the beverage-receptacles, in combination with, corresponding in number to, and with which their respective draft-pipes $a'\ b'\ c'\ d'\ e'$ are adapted for immediate connection, when uncoupled from their beverage-receptacles, a generator for the compressed air, a main air-pipe F connected therewith and a series of branches $a^4\ b^4\ c^4\ d^4\ e^4$ located contiguous to and entering the receptacles and corresponding in number thereto for supplying the necessary compressed air for forcing the beverages through their draft-pipes to their draft-cocks, the several pipes with their branches being provided with stop-cocks for permitting and arresting the flow of their contents, constructed and arranged to operate substantially as specified.

3. A tank D, its opening $i$, its inlets $k\ l$, its outlet $m$, a water-supply pipe E the main pipe H with its branches $a^3\ b^3\ c^3\ d^3\ e^3$ through which the cleansing agent is forced, in combination with, corresponding in number to and with which the draft-pipes $a'\ b'\ c'\ d'\ e'$ are adapted for immediate connection, a generator for the compressed air a main air-pipe F connected therewith and a series of branches $a^4\ b^4\ c^4\ d^4\ e^4$ for supplying the compressed air, whereby the beverages are forced through their draft-pipes to their draft-cocks—and a means of heating the cleansing agent, suitable stop-cocks being provided for permitting and arresting the flow of the contents of the pipes—operating as set forth.

4. In combination—a tank for containing the cleansing agent, its inlets $i\ k\ l$ and outlet $m$ from which the cleansing agent is forced for the purpose stated, and an outlet $n$ from which it is drawn for various domestic uses, and the pipes E, F, G, H for conveying water, compressed air and the cleansing agent, with their respective branch pipes $a^3,\ b^3,\ c^3,\ d^3,\ e^3,\ a^4\ b^4\ c^4\ d^4\ e^4$ and draft-pipes $a'\ b'\ c'\ d'\ e'$, the said pipes being provided with suitable stop-cocks—all arranged for operation as specified.

5. In an apparatus of the class described—the cleansing-fluid tank D with its outlets $m\ n$, the water and compressed-air supply pipes E F, in combination with a stationary main cleansing-pipe F, its minor or branch pipes $a^3,\ b^3,\ c^3,\ d^3,\ e^3$, the draft-pipes $a'\ b'\ c'\ d'\ e'$, their beverage-receptacles $a^2,\ b^2,\ c^2,\ d^2,\ e^2$ and the pipes $a^4,\ b^4,\ c^4,\ d^4,\ e^4$ for conveying compressed air to the beverages therein, as set forth.

Witness my hand this 22d day of October, 1897.

VINCENZO BONZAGNI.

In presence of—
N. W. STEARNS,
A. F. STEARNS.